US009968196B2

(12) United States Patent
Ehrenleitner

(10) Patent No.: US 9,968,196 B2
(45) Date of Patent: May 15, 2018

(54) KINEMATIC MECHANISMS FOR FURNITURE

(71) Applicant: EB-invent GmbH, Alensteig-Walddorf (DE)

(72) Inventor: Franz Ehrenleitner, Altensteig-Walddorf (DE)

(73) Assignee: EB-invent GmbH (DE)

(*) Notice: Subject to any disclaimer, the term of this patent is extended or adjusted under 35 U.S.C. 154(b) by 51 days.

(21) Appl. No.: 14/859,089

(22) Filed: Sep. 18, 2015

(65) Prior Publication Data

US 2016/0081478 A1 Mar. 24, 2016

(51) Int. Cl.
| A47C 3/18 | (2006.01) |
| F16M 11/12 | (2006.01) |
| F16M 11/24 | (2006.01) |
| A47C 1/024 | (2006.01) |
| A47C 3/025 | (2006.01) |
| A47C 9/00 | (2006.01) |

(52) U.S. Cl.
CPC .............. A47C 3/18 (2013.01); A47C 1/0242 (2013.01); A47C 3/0255 (2013.01); A47C 9/005 (2013.01); F16M 11/123 (2013.01); F16M 11/24 (2013.01)

(58) Field of Classification Search
CPC .... A47C 3/02; A47C 3/18; A47C 7/40; A47C 9/005; A47C 3/0255; F16M 11/123
USPC .................... 297/313, 314, 325, 354.1, 258.1
See application file for complete search history.

(56) References Cited

U.S. PATENT DOCUMENTS

| 3,141,669 | A | * | 7/1964 | Chul | ...................... | A63B 19/04 |
| | | | | | | 472/17 |
| 4,798,361 | A | * | 1/1989 | Fawcett | ................... | A47C 3/18 |
| | | | | | | 248/188.4 |
| 4,799,667 | A | * | 1/1989 | Suchy | ..................... | A63B 19/04 |
| | | | | | | 280/206 |
| 4,824,099 | A | * | 4/1989 | Rusu | ....................... | A63G 31/00 |
| | | | | | | 434/55 |
| 4,852,943 | A | * | 8/1989 | Roper | .................... | A47C 3/026 |
| | | | | | | 297/302.1 |
| 5,342,244 | A | * | 8/1994 | Nelson | ................... | A63B 19/04 |
| | | | | | | 472/14 |
| 5,409,295 | A | * | 4/1995 | Edstrom | .............. | A47C 3/0255 |
| | | | | | | 248/372.1 |
| 5,588,704 | A | * | 12/1996 | Harza | .................. | A47C 3/0255 |
| | | | | | | 297/314 |
| 5,759,107 | A | * | 6/1998 | Nagel | .................... | A63G 31/16 |
| | | | | | | 434/55 |
| 5,769,492 | A | * | 6/1998 | Jensen | ................... | A47C 9/002 |
| | | | | | | 297/188.09 |
| 6,331,152 | B1 | * | 12/2001 | Holle | ...................... | A47C 3/02 |
| | | | | | | 434/55 |
| 6,988,951 | B1 | * | 1/2006 | Newman | ................ | A63G 31/16 |
| | | | | | | 472/112 |
| 8,100,476 | B2 | * | 1/2012 | Jenkins | .................. | A47C 3/026 |
| | | | | | | 297/284.4 |

(Continued)

*Primary Examiner* — Brian E Glessner
*Assistant Examiner* — Adam G Barlow
(74) *Attorney, Agent, or Firm* — Kolisch Hartwell, P.C.

(57) ABSTRACT

Items of furniture that include a chassis, a kinematic mechanism mounted upon the chassis, and a base furniture part that is movably coupled to the kinematic mechanism, provided that the kinematic mechanism is configured to permit independent rotation around three distinct axes, and that the three distinct axes intersect one another at a central point.

12 Claims, 12 Drawing Sheets

(56) References Cited

U.S. PATENT DOCUMENTS

| | | | | |
|---|---|---|---|---|
| 8,579,714 B2* | 11/2013 | Trui | .................. | A63G 31/00 |
| | | | | 472/57 |
| 2008/0114560 A1* | 5/2008 | Jonas | .................. | F16M 11/123 |
| | | | | 702/94 |
| 2008/0191525 A1* | 8/2008 | Jensen | .................. | A47C 9/002 |
| | | | | 297/217.2 |
| 2014/0132051 A1* | 5/2014 | Freedman | .............. | A47C 7/024 |
| | | | | 297/312 |
| 2016/0311536 A1* | 10/2016 | Schultheis | ............... | A47C 7/14 |
| 2016/0360889 A1* | 12/2016 | Matlin | .................... | A47C 7/02 |

* cited by examiner

KINEMATIC MECHANISMS FOR FURNITURE

TECHNICAL FIELD

The invention relates to an item of furniture with a pivotable part, in particular an office chair or a chair for use in connection with training or games with virtual reality.

BACKGROUND

Office chairs have, above a height-adjustable support part which in this application is regarded as belonging to the chassis, a seat surface and a backrest, which are jointly rotatable about a common vertical axis, in most cases the vertical axis of the support part, and are pivotable about at least a horizontal axis individually or dependently on each other. Mechanisms are available by which the pivoting movement takes place about an axis that is not fixed in position relative to the support part, but in which the position of the axis changes (but in most cases one to one) during the pivoting.

A problem in all such chair kinematics is, on the one hand, the relatively small available space and, on the other hand, the not inconsiderable forces and moments that occur, and the desire, sometimes even a necessity, to switch off the pivotability about individual axes, which in the jargon is called fixing an axis.

What is needed is a kinematic mechanism that meets these conditions in a simple, cost-effective and mechanically stable way.

SUMMARY

The present disclosure provides kinematic mechanisms for use in items of furniture.

In some aspects, the present disclosure provides an item of furniture that includes a chassis, a kinematic mechanism mounted upon the chassis, and a base furniture part that is movably coupled to the kinematic mechanism, provided that the kinematic mechanism is configured to permit independent rotation around three distinct axes, and that the three distinct axes intersect one another at a central point.

In some aspects, the present disclosure provides an office chair with a seat surface and a backrest that is mounted pivotably on the seat surface via a pivot mechanism. The pivot mechanism includes a base part connected rigidly to the seat surface, an intermediate part mounted on the base part so that it is rotatable about a base axis, a secondary arm mounted rotatably on the intermediate part so that it is rotatable about an intermediate axis, and a pivot part that is mounted rotatably on the secondary arm so that it is rotatable about an end axis and which is connected to the backrest. The pivot mechanism is further configured so that the base axis, the intermediate axis and the end axis intersect one another at a central point.

In some aspects, the present disclosure provides a chair suitable for kneeling, the kneeling chair including a movable and/or height-adjustable and substantially vertically arranged column, a base connected at the upper end of the column, at least one seat surface movable relative to the base, and at least one of a backrest and a knee support. The kneeling chair further includes a kinematic mechanism disposed between the base and the seat surface, where the kinematic mechanism is configured so that the seat surface can execute a spherical movement relative to the base, and about a central point disposed above the seat surface. Furthermore, the kneeling chair includes either a pin that is connected to the base that protrudes into a slotted-guide opening connected to the seat surface, or a pin that is connected to the seat surface and protrudes into a slotted-guide opening which is connected to the base.

A variety of features, functions, and advantages may be achieved independently in various embodiments of the present disclosure, or may be combined in yet other embodiments, further details of which can be seen with reference to the following description and drawings.

DETAILED DESCRIPTION

The Items of furniture of the present disclosure may include a chassis, a kinematic mechanism mounted upon the chassis, and a base furniture part that is movably coupled to the kinematic mechanism, where the kinematic mechanism may be configured to permit independent rotation around three distinct axes, provided that the three distinct axes intersect one another at a central point.

A "kinematic" or "kinematic mechanism" of a chair refers to a mechanism disposed between a base of a chair and the seat surface of that chair, the mechanism being configured to permit the relative movement of the seat surface relative to the base.

The disclosed kinematic is explained below with reference to an office chair, wherein the terms used such as "above", "below", "transverse", "longitudinal", "front", "rear" and the like are always used in the colloquial sense, that is, relative to the point of view of the user of the chair.

Although the disclosed kinematic may be explained with reference to an office chair, it will be clear to a person skilled in the art that a variety of devices such as gymnastic aids, therapeutic and medical couches, stretchers and chairs (seats), as well as other items of furniture (tables, beds, etc.) with deployable parts can also be provided with the kinematic mechanisms according to the present disclosure.

The items of furniture of the present disclosure may include a kinematic provided between a base and a seat bearing, which kinematic permits the spherical movement of the seat bearing and thus of the seat surface about a base-fixed central point above the seat surface; in a possible kinematic a horizontal axis for the pivoting of the seat surface is provided on the height-adjustable support part, and a sequence of three mutually pivotable and serially arranged arms is formed on the seat surface, of which the last arm is connected rigidly to the backrest, and of which three pivot axes intersect one another at one point. This point preferably lies in the pelvic region of the presumptive user, preferably at about the height of the center of gravity of the user.

In an alternative, two hinged parallelograms are suitably combined with a four-bar linkage in order to arrive at this mobility. Either the plane in which the three bar systems forming a movement grid lie can be designed to be pivotable about an axis, or several such movement grids are provided, as is described in the publication WO 2013/029069.

Figure 1:
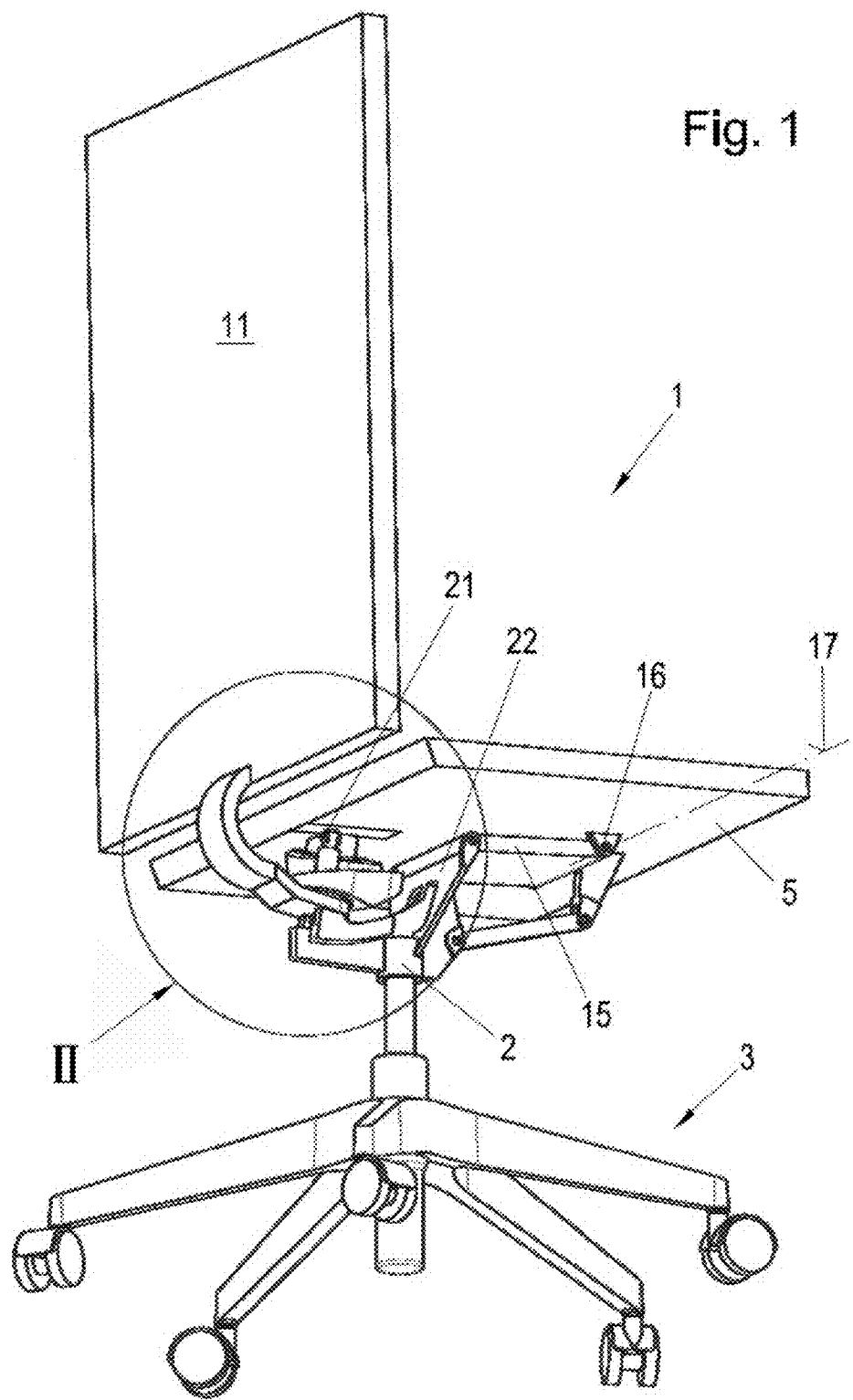
FIG. 1 is a semi-schematic illustration of an office chair according to the present disclosure, in a perspective view from below.
Figure 2:
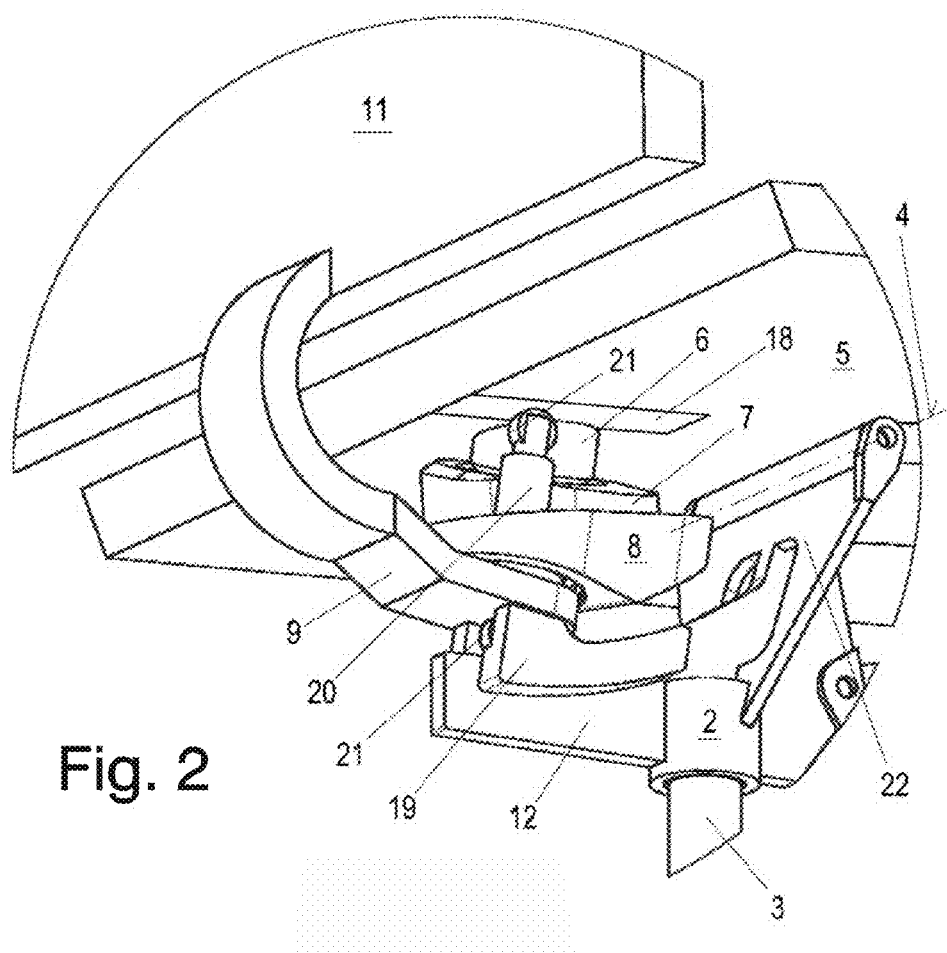
FIG. 2 is an enlarged view of the detail II as indicated in FIG. 1.

As will be seen from FIGS. 1 and 2, an exemplary office chair 1 has a chassis 3 with foot part, legs, rollers and shock-absorbed mechanism for height adjustment, on the upper end of which a support part 2 is rotatably arranged. The support part 2 has on the one hand, directed toward the rear in the illustrative embodiment, a fin 12 and, on the other hand, directed toward the front in the illustrative embodiment, an approximately triangular support wing 22. From the support wing 22, two struts 15, mounted thereon in an articulated manner about a wing axis 4, lead to a respective seat bearing 16, about the common seat axis 17 of which a seat surface 5 (generally corresponding in furniture items to the base furniture part) is pivotable. A four-bar linkage (without reference sign) visible below this construction produces the statically defined position and can, if appropriate, serve to regulate the inclination of the seat surface in the rest position. As has been explained, the seat axis 17 is positionally fixed in relation to the seat surface 5, but not in relation to the support part 2, to which it is connected in an articulated manner via the struts 15 and the support wing 22.

The items of furniture of the present disclosure may incorporate, but are not required to incorporate, one or more armrests, and any armrest disclosed or described is only included for reasons of clarity.

Figure 3:
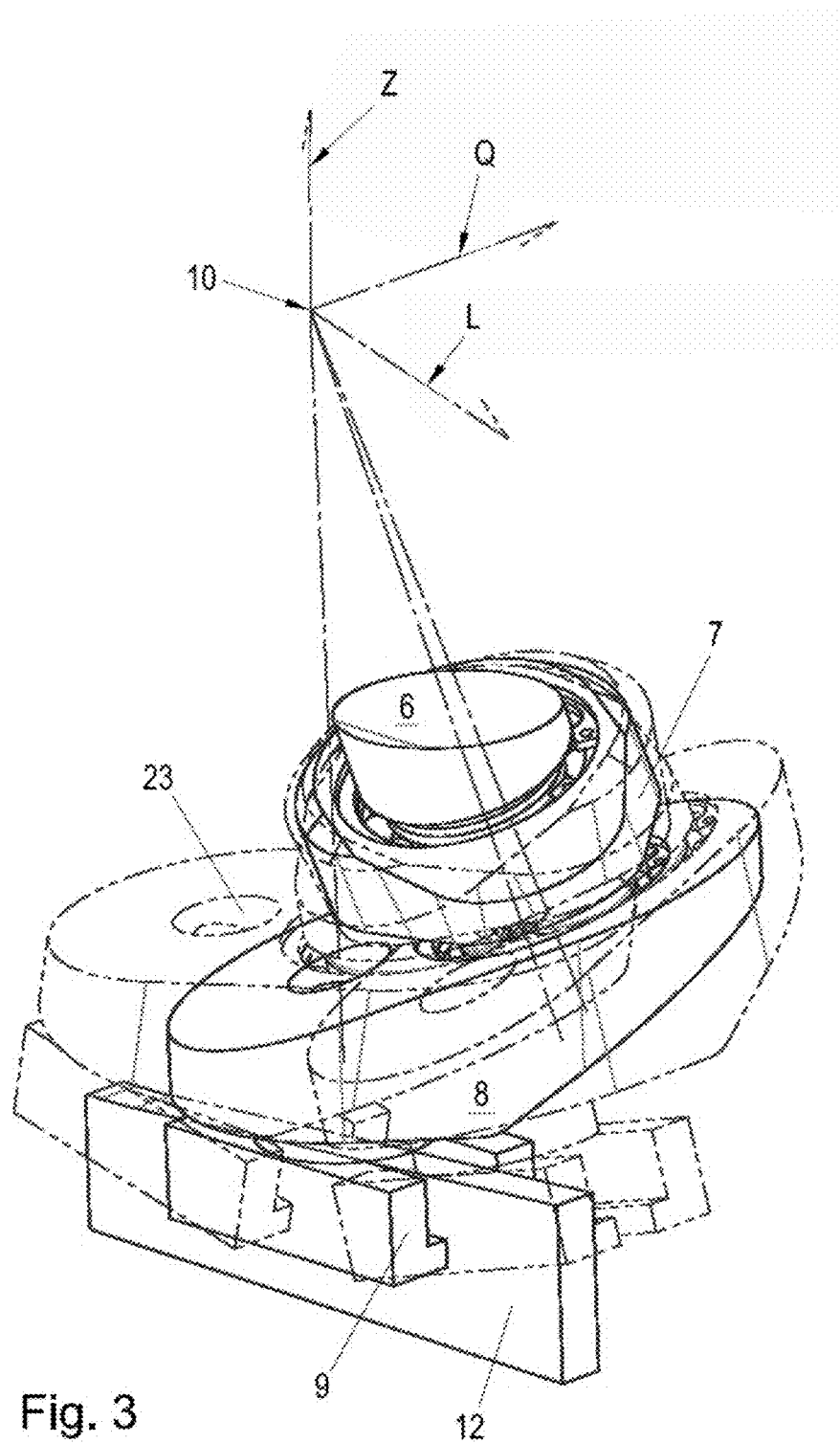
FIG. 3 is a schematic illustration of the kinematic mechanism of the office chair of FIG. 1, with two fixed degrees of freedom.
Figure 4:
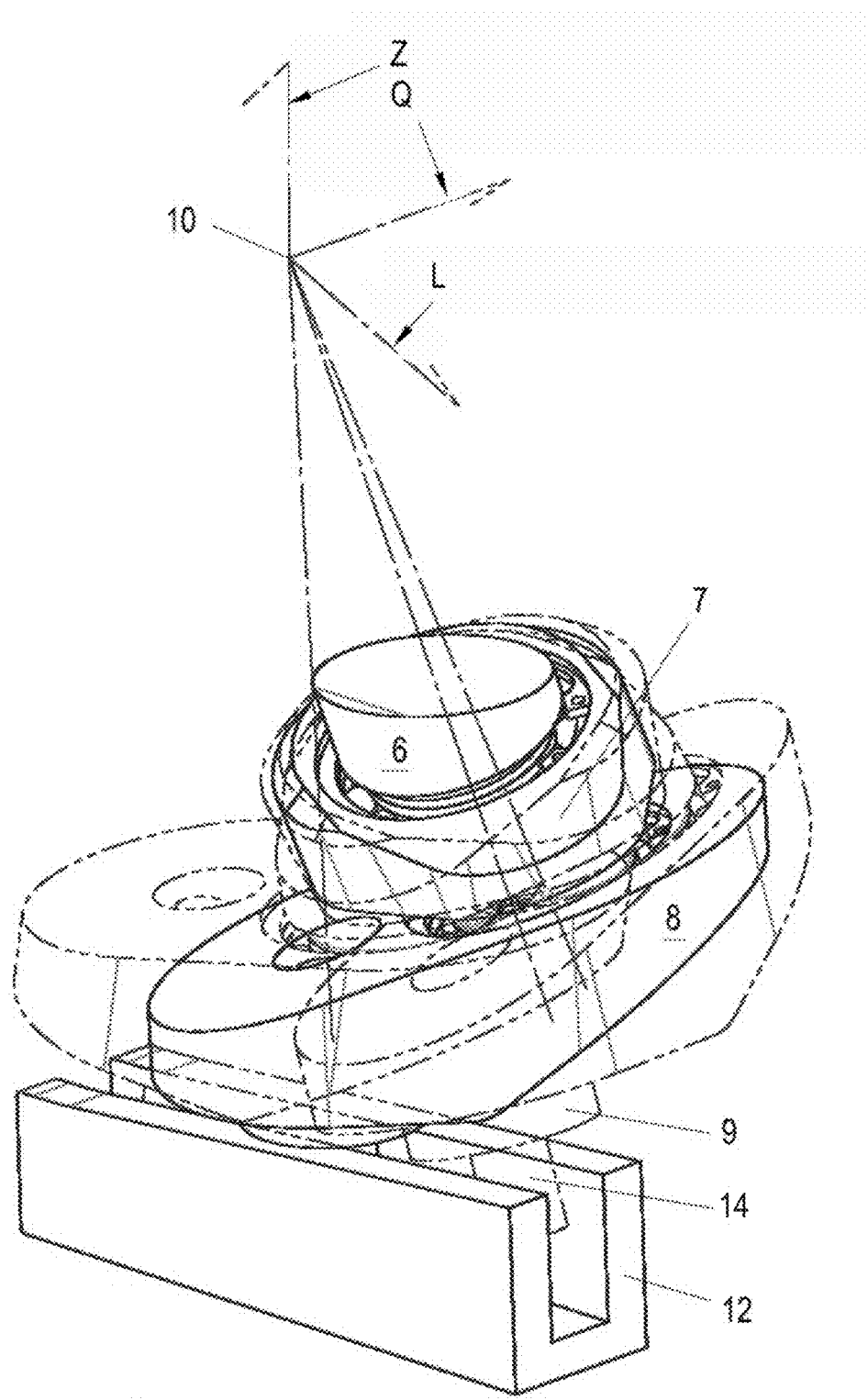
FIG. 4 illustrates the kinematic mechanism of FIG. 3, with one fixed degree of freedom.
Figure 5:
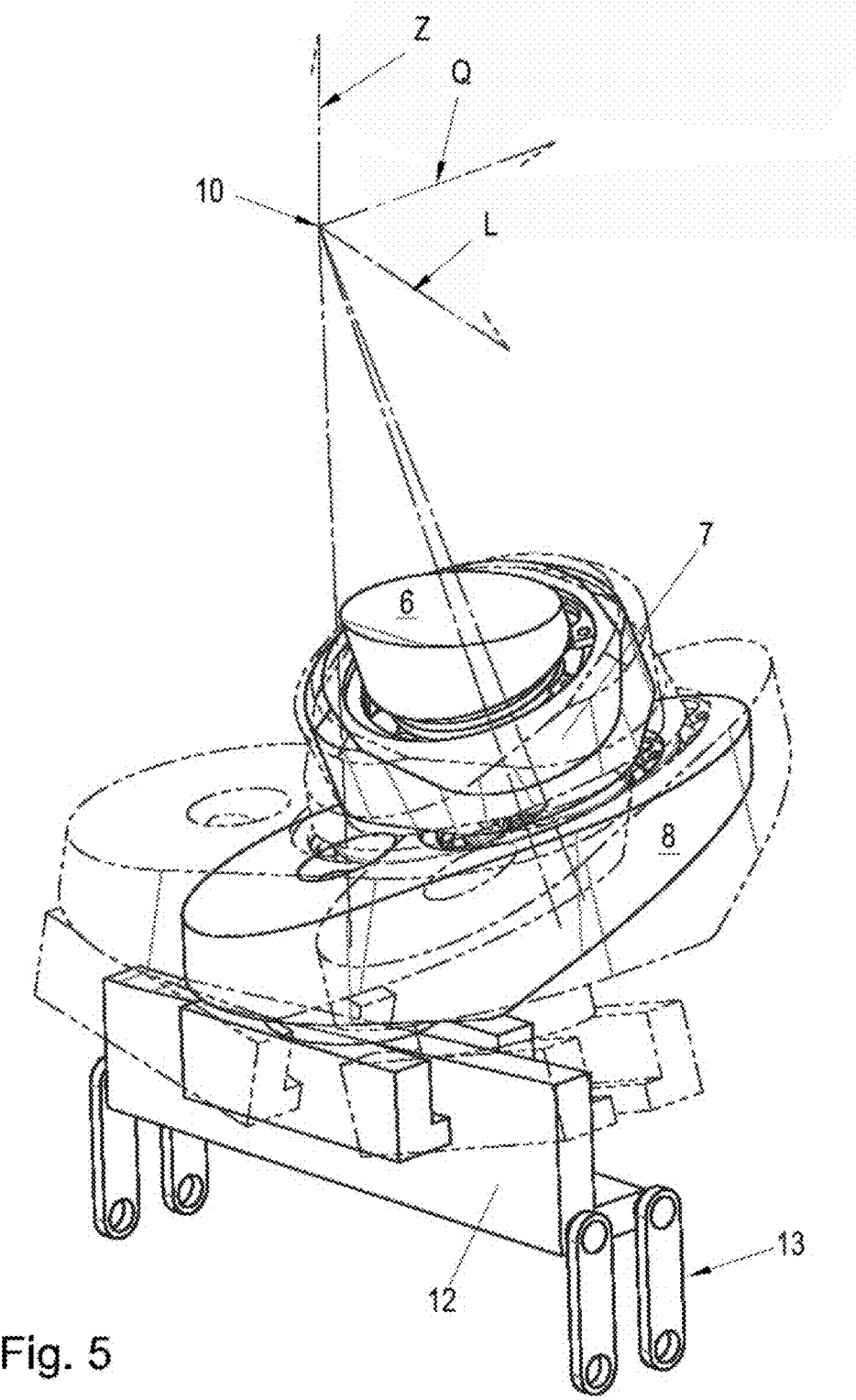
FIG. 5 illustrates an alternative and exemplary kinematic mechanism with one fixed degree of freedom.

A base part 6 (FIG. 2) is rigidly mounted at the rear area of the seat surface 5 (base furniture part). An intermediate part 7 is mounted rotatably about a base axis on the base part 6, a secondary arm 8 is mounted rotatably in turn on the intermediate part 7, and a backrest part 9 is mounted, likewise rotatably, on this secondary arm 8. According to the present disclosure, provision is made that the rotation axes between the base part and the intermediate part 7, between the intermediate part 7 and the secondary part 8, and between the secondary arm 8 and the backrest part 9 intersect one another at a central point 10. The backrest 11 (generally corresponding in furniture items to the pivotable furniture part) is rigidly connected to the backrest part 9 (optionally resiliently). The individual axes are shown in FIGS. 3-5 but, in order to avoid overcomplication, they do not bear reference signs; only the central point 10 is indicated in each case.

Through this mechanism, a previously unattainable mobility is now achieved about this central point 10, thus also about three Cartesian axes (or axes parallel thereto) which are not embodied physically but are indicated with their origin in the central point 10. These are the vertical axis Z, the transverse axis Q and the longitudinal axis L. In the individual embodiments shown, the respective blocking of the pivoting movement about one or two of these axes is achieved through different measures which are simple and robust and, in accordance with the invention, can also be combined with one another in a simple way.

Moreover, in the illustrative embodiment shown, a not necessarily used mechanism for creating a counterforce when leaning back is provided: between a seat running surface 18 on the underside of the seat surface 5 and a for the most part curved fin running surface 19 on the fin 12, a spacer rod 20 is clamped with in each case a running roller 21 at the upper and at the lower end. Its momentary position arises from its being guided in a guide opening 23 in the secondary arm 8 (see also FIG. 3). It also protrudes through a further but correspondingly larger through-opening (not shown) in the backrest part 9, although its position is not influenced by this: it is only influenced by the guide opening 23.

The spacer rod 20 is guided longitudinally displaceably in this guide opening 23, but not rotatably, such that it always rolls at right angles with its running rollers 21 along the running surfaces 18, 19. When the user leans back, the guide opening 23 shifts/turns and carries the spacer rod with it, subjects it to a bending stress, the weight of the user, mounted pivotably about the seat axis 17, presses via the spacer rod 20 and the guide opening 23 against leaning back on the backrest part 9. Other such mechanisms known from the prior art can of course be used, although this, with its compact and through the shape of the fin running surface 19 easily adaptable to different configurations, is suitable very particularly for combination with the pivot mechanism according to the invention.

It will be seen from the content of FIG. 1 and FIG. 2 that the support part 2 has a fin 12 which extends in the longitudinal direction L but which of course can also be designed differently; in the illustrative embodiment shown, it serves to fix the rotation about the axis L, and the axis Q, and it does so as follows:

As FIG. 4 shows, a pin 11 protrudes from the backrest part 9 into the fin 12, in this case designed with a groove, and thus prevents the rotation about the longitudinal axis L. However, on account of the rotatability of the pin 11 in the groove 12 about its longitudinal axis (not shown), there is no further axial fixing.

If one considers FIG. 3 by comparison, in which the fin 12 is designed without a groove, it will be seen that, instead of the pin 11 of the backrest part 9, the latter has a rectilinear guide which is guided along the fin on both sides (for the sake of clarity, optional rollers or sliding surfaces are not shown), through which, as can be seen from the comparison positions indicated in broken lines, only a rotation about the transverse axis Q is now enabled, whereas both a rotation about the vertical axis Z and also a rotation about the longitudinal axis L is prevented.

Since occasionally the arrangement of such fins and/or grooves on correspondingly solid locations of a swivel chair or office chair is not always easily possible, FIG. 5 shows a variant in which, although the rotation about the vertical axis Z is blocked, both a rotation about the transverse axis Q and also about the longitudinal axis L is permitted, as is nowadays always desirable in office chairs used for gymnastic purposes. This is achieved by the fact that, as is shown by a comparison with FIG. 3, the fin 12 is not connected in a fixed manner to the support part 2, but instead via a parallel guide by means of two hinged parallelograms 13. This embodiment has the advantage that the actual securing on the support part, of which the shape can be chosen very freely, can vary within wide limits. In addition, this variant is often expedient to use particularly in other items of furniture, for example couches and folding beds.

Figure 6:
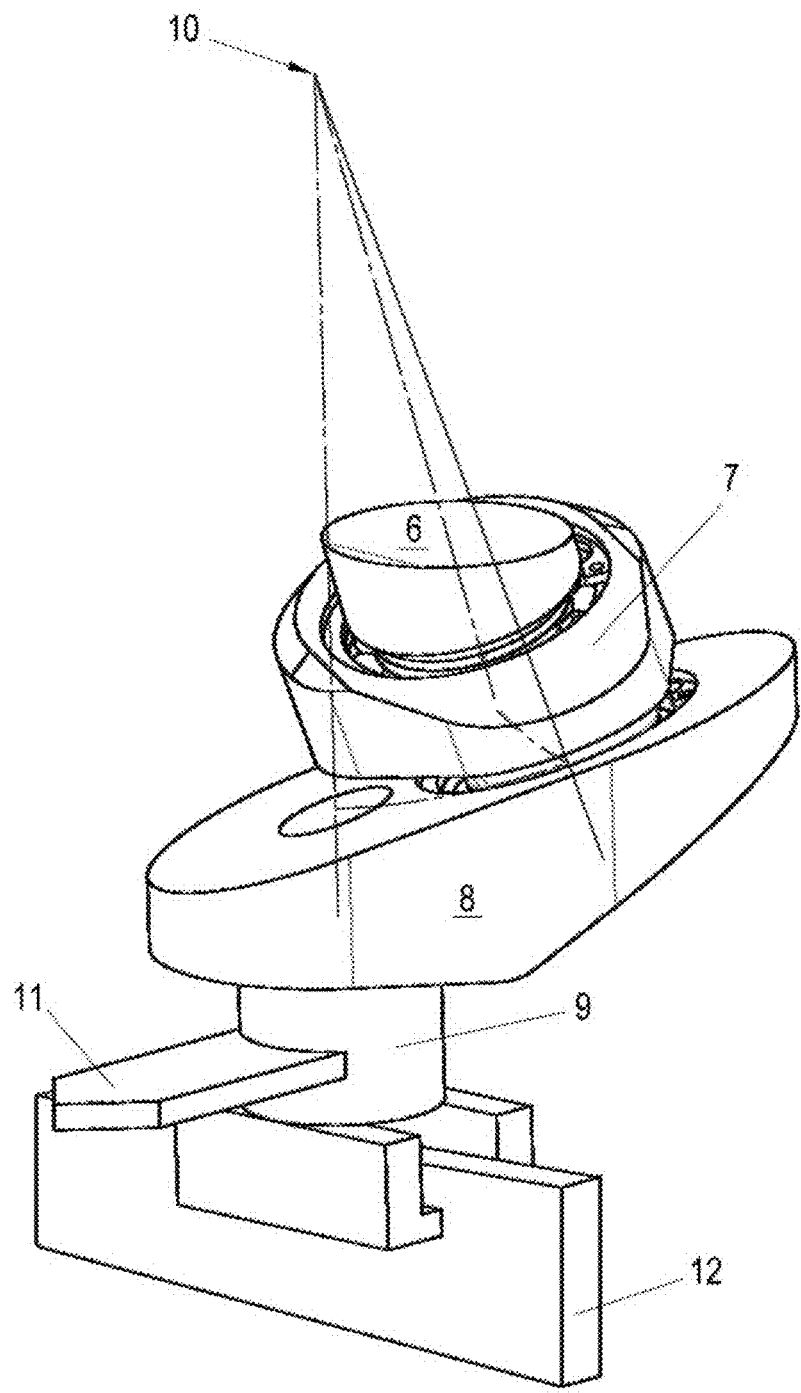
FIG. 6 illustrates another alternative and exemplary kinematic mechanism of the present disclosure.

In dimensions slightly different than those of the previously shown mechanism, FIG. 6 shows a mechanism whose function corresponds to that of FIG. 3. This figure clearly shows, indicated with a rib, the attachment of the backrest 11 to the backrest part 9.

Figure 7:
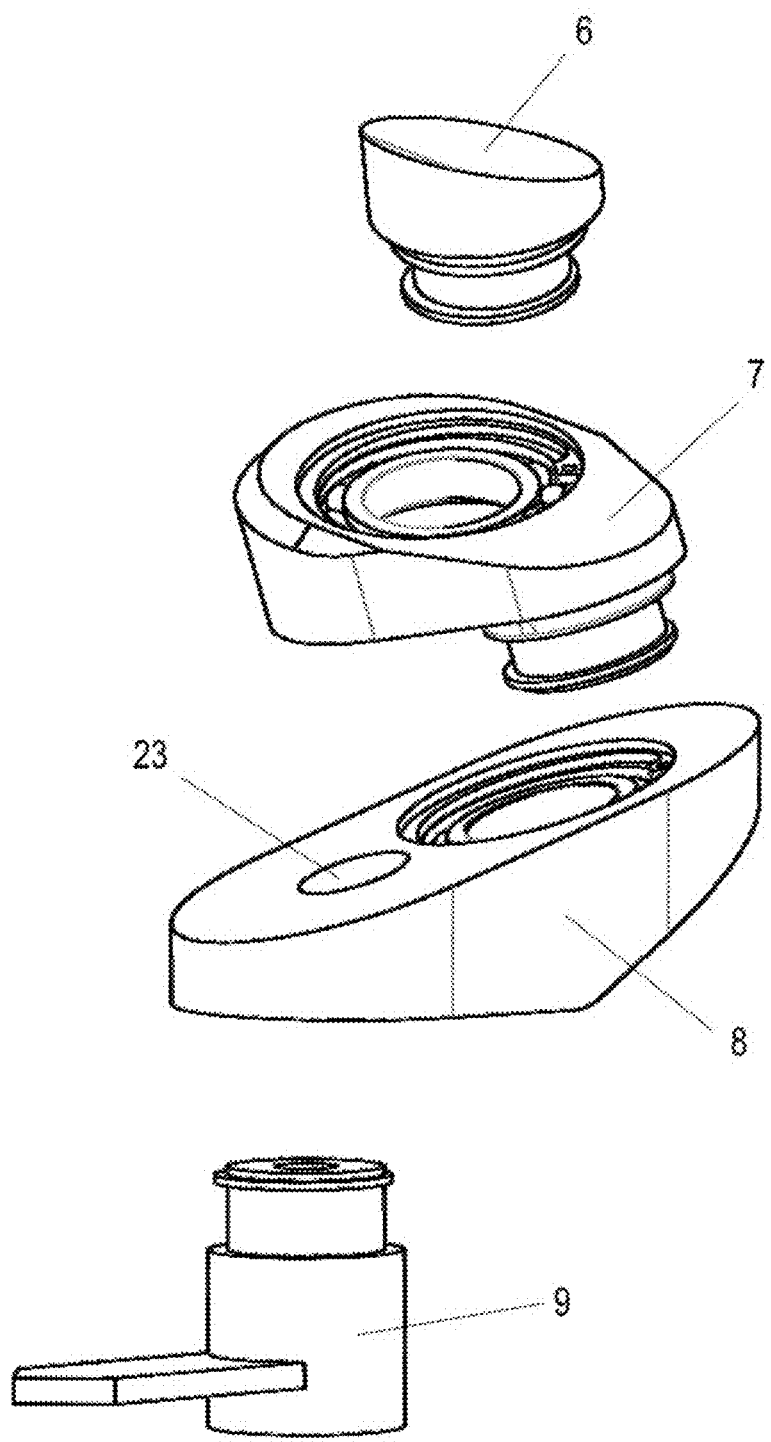
FIG. 7 is a schematic and exploded view of the kinematic mechanism of the office chair of FIG. 1.

FIG. 7 shows, in the manner of an exploded view, the more exact design of the individual components of the mechanism according to the invention, of the base part 6, of the intermediate part 7, of the secondary arm 8 and also of the guide opening 23 and of the backrest part 9. The annular design results in a compact and extremely mechanically stable construction that is able to safely transmit the great forces through the short lever arms. Details of the bearing configuration, such as circlips and roller bearings, are also indicated; these can be provided in many different forms.

It should also be noted that the three axes between the serially arranged components 6/7, 7/8 and 8/9 permit, through their common central intersection 10, the rotation about the Cartesian axes Z, Q and L, and that, if so desired, through suitable configuration of the guide 9/12 (13, 14), the rotation about one or more of the Cartesian axes is prevented.

Figure 8:
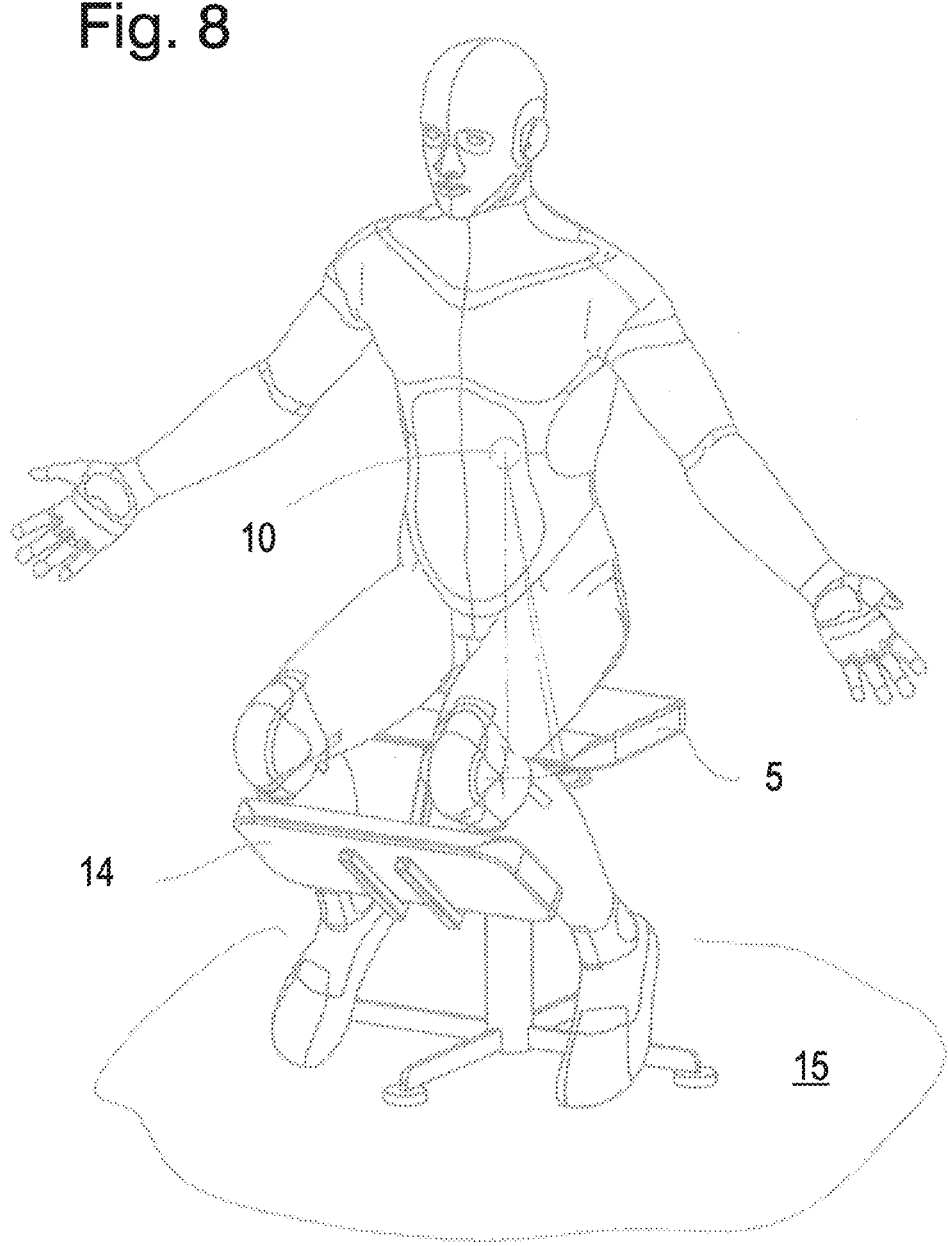
FIG. 8 is a semi-schematic illustration of a kneeling chair according to the present disclosure, depicting a user of the kneeling chair.

FIG. 8 shows a variant on the basis of a kneeling chair, in which a knee surface 14 is connected rigidly or resiliently or adjustably to the seat surface 5. In this view, the height position of the central point 10 above the stand surface 15 on which the chair rests can be clearly seen. Since the center of gravity of the user is located in the area of the central point 10 and in most cases noticeably below this, he is able to maintain his balance without straining the nerves and/or muscles, and yet the user is encouraged to perform movement, as a result of which the blood circulation, particularly in the area of the lower spinal column, is better than in a purely resting position.

Figure 11:
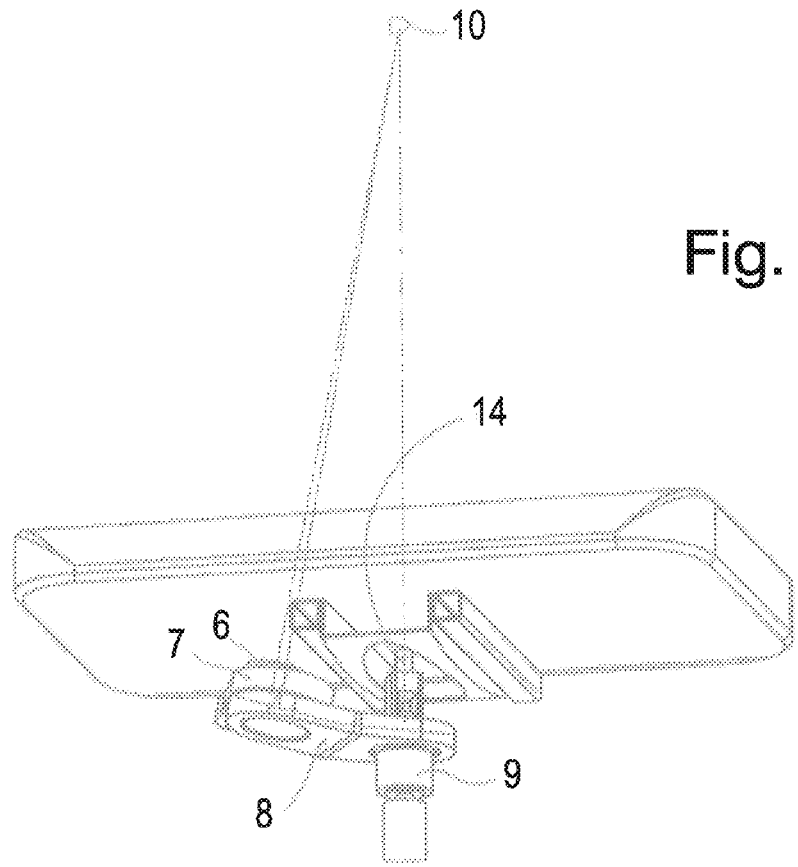
FIG. 11 is a bottom plan view of the kinematic mechanism of FIG. 10.
Figure 10:
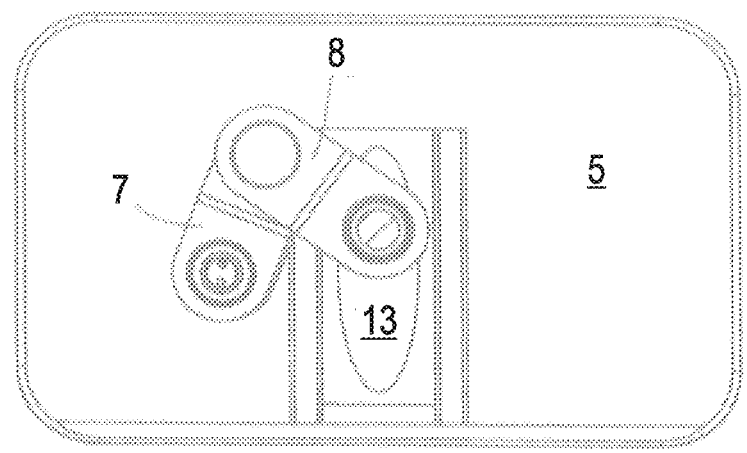
FIG. 10 is a perspective view of another alternative and exemplary kinematic mechanism of the present disclosure.
Figure 12A:
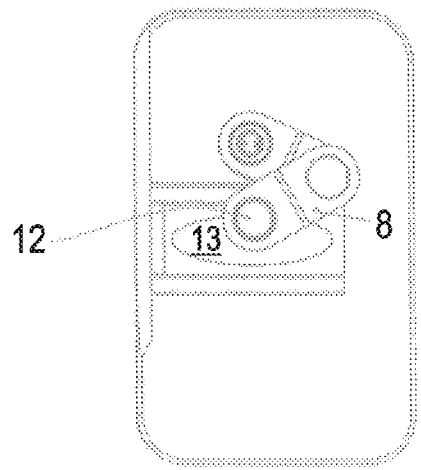
FIGS. 12a-12d depict the functioning of the kinematic mechanism of FIG. 10.
Figure 12B:
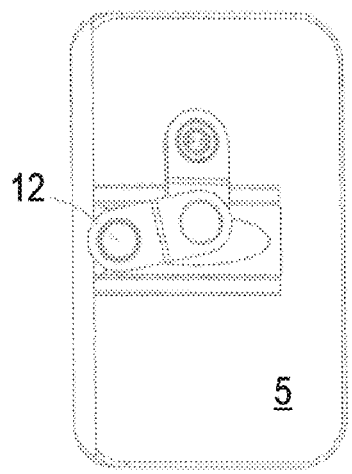
Figure 12C:
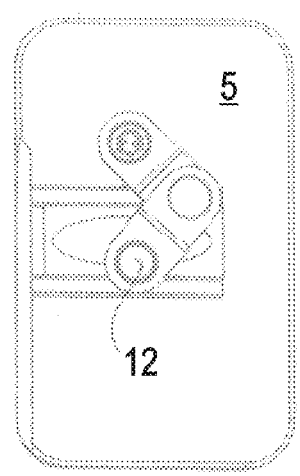
Figure 12D:
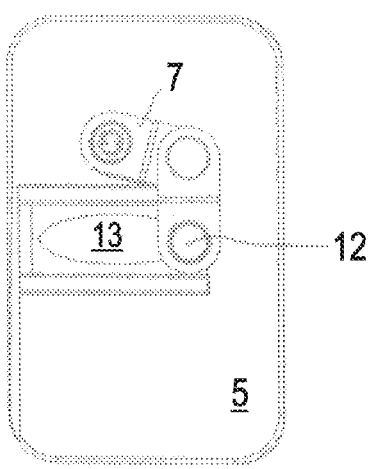

As can also be seen from FIGS. 10 and 11, the mechanism that effects the mobility of the pivotable parts relative to the base (base shaft 9) comprises the following: A base arm 8 is arranged pivotably on the base via a base shaft 9, on which base arm 8 an intermediate arm 7 is pivotably arranged in turn, on which, finally, a seat connection part 6 is pivotably mounted. The three pivot axes are here configured and oriented such that they at all times intersect each other at one point, the central point 10. The seat connection part 6 is suitably connected to the seat surface 5 either rigidly or resiliently or is formed thereon.

Since, as was mentioned at the outset, the spherical pivotability of the seat surface 5, and of all the components connected to it, about the central point 10 is intended, as a function of the orientation of the seat surface, to be kept within limits that depend on the respective area of use, provision is now made according to the invention (FIG. 3 and FIG. 4) that a pin 12 fixed to the base protrudes into a recess of the seat surface, namely the slotted-guide opening 13, as a result of which the movement of the seat surface 5 and of the parts of the chair attached to it is limited, preferably to all sides.

The slotted-guide opening 13 and the pin 12 can be seen clearly in FIG. 3 and FIG. 4. In the description and in the claims, the component that has the slotted-guide opening 13 is itself casually designated as "slotted-guide opening 13".

FIG. 12 shows, in four individual views 12a to 12d, the respective end positions of the pin 12 (to be imagined in the continuation of the base shaft 9) in the slotted-guide opening 13.

Figure 13:
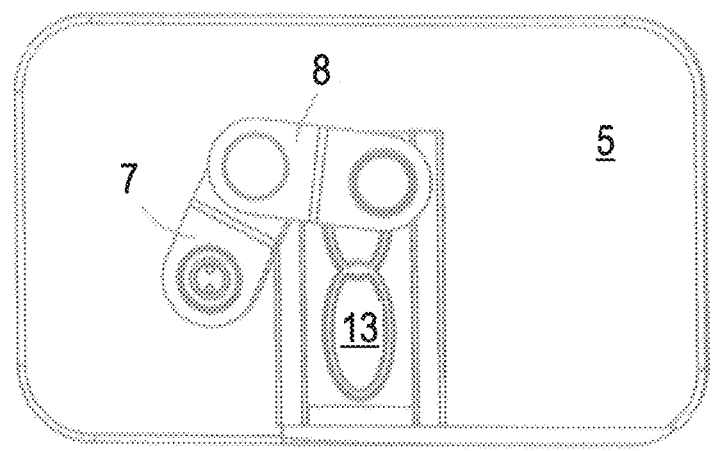
FIG. 13 is a perspective view of another alternative and exemplary kinematic mechanism of the present disclosure.

FIG. 13 shows a bottom view of the kinematic by which the central point 10 is embodied, and a slotted-guide opening 13 in the form of a "real" slotted guide, without lateral freedom of movement, which in this view has the shape of a recumbent figure "8". The pin here always moves along the "8"; the slotted guide branches at the center. "Recumbent" means that the two "bulges" lie in the left-right axis of symmetry, and therefore the seat surface has the greatest lateral excursion in a position bent slightly forward or in a position leaning slightly back.

Figure 14:
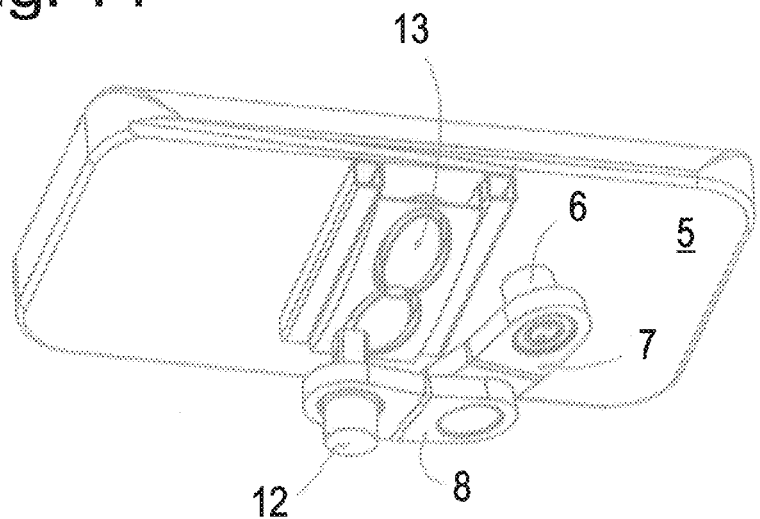
FIG. 14 is a bottom plan view of the kinematic mechanism of FIG. 13.

FIG. 14 shows a perspective bottom view of a variant of the invention, from which it will be clearly seen that the three axes with their arms can be provided very flat and do not need any more space than conventional kinematics of swivel chairs, etc., according to the prior art.

Figure 9:
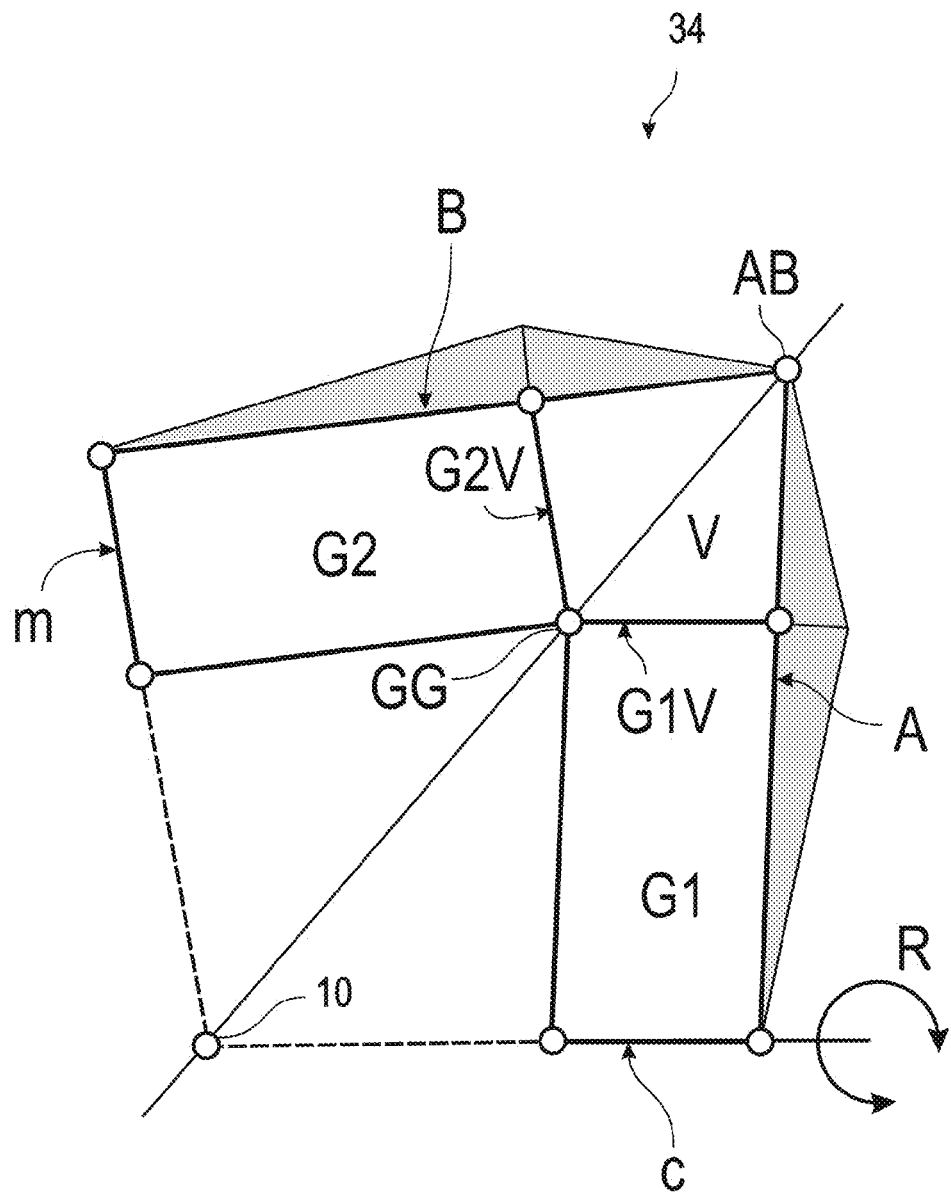
FIG. 9 is a schematic illustration of kinematic mechanism according to the present disclosure that incorporates hinged parallelograms.

As was mentioned above, the use of a kinematic according to FIG. 9 is also possible. This consists of a hinged parallelogram G1, which is mounted fixedly with its edge c. Opposite the side or edge c, a four-bar linkage V is provided which has in common with G1 this edge G1V. This four-bar linkage V moreover has the edge adjacent to G1V, i.e. G2V, in common with the second hinged parallelogram G2. The two "outer" edges A and B of this movement grid extend through G1 and V or G2 and V, respectively, as is indicated by the stiffening triangles filled in gray.

The continuation of the edge m of G2, which lies opposite the edge G2V, intersects the continuation of c at the central point 10; likewise the continuation of the diagonal of V between the outermost corner point AB and the inner corner point GG. This point of intersection, the central point 10, is maintained at all times under the conditions explained.

If the movement grid is designed to be pivotable about c, or if two or more such movement grids arranged obliquely to each other are provided with a common central point 10, a spherical movement of m or about this central point is possible and can be used for the purpose of the invention.

With knowledge of the invention, the dimensioning of the individual components and the choice of the materials that can be used will pose no problem to a person skilled in the art in the production of seat furniture.

It is specifically noted once again that pin and slotted-guide opening can be secured on the respective other component, this merely entailing a simple kinematic reversal, as is routine to any person skilled in the art of kinematics.

The invention is not limited to the examples shown. The shapes and dimensions of the components base part, intermediate part, secondary arm, backrest part, can have other shapes and dimensions and can be completely different in other items of furniture, as long as the rotation axes defined between them intersect only at one point, i.e. the central point 10.

The materials used here can be all those materials employed in furniture construction for pivot mechanisms, in particular steel, if appropriate with roller bearings or sliding bearings with bushes made of suitable bearing metal.

EXEMPLARY EMBODIMENTS

This section describes additional aspects and features of the items of furniture and chairs of the present disclosure, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A1. item of furniture with a base furniture part and with a pivotable furniture part mounted pivotably on the latter by means of a pivot mechanism, characterized in that the pivot mechanism comprises a base part (6) connected rigidly to the base furniture part, an intermediate part (7) mounted rotatably thereon about a base axis, a secondary arm (8) mounted rotatably on the intermediate part (7) about an intermediate axis, and a pivot part (9) which is mounted rotatably on the latter about an end axis and which is connected rigidly, but optionally resiliently, to the pivotable furniture part, on condition that the three axes intersect one another at a central point (10).

A2. An item of furniture according to paragraph A1, characterized in that it is an office chair (1), in that its base furniture part is a seat surface (5) and the pivotable furniture part is a backrest (11) of the office chair.

A3. The office chair according to paragraph A2, having a chassis (3) with a support part (2) on which the seat surface (5) is secured, optionally pivotably, characterized in that the base part (6) is arranged on the underside of the seat surface (5) behind the point where the support part (2) is secured.

A4. The office chair according to paragraph A3, characterized in that the support part (2), directed toward the rear, has a fin (12), and in that the pivot part (9) is guided in a rotationally fixed manner on this fin. (FIG. 3)

A5. The office chair according to paragraph A3, characterized in that the support part (2), directed toward the rear, has a fin (12) with a longitudinal groove, and in that the pivot part (9) is guided rotatably in the groove. (FIG. 4)

A6. The office chair according to paragraph A3, characterized in that the support part (2), directed toward the rear, has a fin (12), in that this fin is mounted displaceably in the direction of the transverse axis (Q) parallel to itself, and in that the pivot part (9) is guided in a rotationally fixed manner on this fin. (FIG. 5)

A7. The office chair according to one of paragraphs 3 to 6, characterized in that a seat running surface (18) is provided on the underside of the seat surface (5) and a fin running surface (19) is provided on the fin (12), in that a spacer rod (20) with running rollers (21) at its ends is provided between these running surfaces, its running rollers rolling on the running surfaces, and in that the spacer rod (20) is guided longitudinally displaceably but in a rotationally fixed manner in a guide opening (23) in the secondary arm (8).

B1. A chair with an optionally movable and/or height-adjustable, substantially vertically arranged column, on the upper end of which a base (2) is secured or formed; with at least one seat surface (5) movable relative to the base (2), and optionally with a backrest (11) and/or at least one knee support (14), and optionally with armrests, characterized in that a kinematic (4) is provided between the base (2) and the seat surface (5), by means of which kinematic (4) the seat surface (5) can execute a spherical movement, relative to the base (2), about a central point (10) lying above the seat surface (5), and in that a) either a pin (12) is connected to the base (2) and protrudes into a slotted-guide opening (13) which is connected to the seat surface (5), b) or a pin (12) is connected to the seat surface (5) and protrudes into a slotted-guide opening (13) which is connected to the base (2).

B2. The chair according to paragraph B1, characterized in that the slotted-guide opening (13) or the pin (12) is provided on a seat connection part (6) on which the kinematic (4) also engages.

B3. The chair according to paragraph B1, characterized in that the slotted-guide opening (13) or the pin (12) is connected resiliently to the seat connection part (6).

B4. The chair according to paragraph B1, characterized in that the pin (12) or the slotted-guide opening (13) is connected resiliently to the base (2).

B5. The chair according to paragraph B1, characterized in that the pin (12) carries, if appropriate radially resiliently, a rotatable ring that is in contact with the edge of the slotted-guide opening (13).

B6. The chair according to one of paragraphs B1 to B5, characterized in that the slotted-guide opening (13) is a slotted guide that has the shape of a figure "8".

B7. The chair according to one of the preceding paragraphs, characterized in that the kinematic (4) consists of at least one base arm (8) arranged pivotably on the base (2) via a base shaft (9), and of an intermediate arm (7) which is arranged pivotably on the base arm (8) and which is mounted pivotably on the seat surface (5) or on the seat connection part (6), which is connected rigidly or resiliently or adjustably to the seat surface (5), with the proviso that the three pivot axes at all times intersect each other at one point, the central point (10).

B8. The chair according to one of paragraphs B1 to B6, characterized in that the kinematic (4) is a movement grid composed of at least one hinged parallelogram (G1), which is mounted fixedly with an edge (c), optionally pivotably about the latter, and, arranged opposite the side or edge (c), a four-bar linkage (V) which has the edge (G1V) in common with hinged parallelogram (G1), and of a further hinged parallelogram (G2) which has the edge adjacent to the edge (G1V) in common with the four-bar linkage (V), with the proviso that the two outer edges (A) and (B) of this movement grid each extend rectilinearly through the hinged parallelogram (G1) and the four-bar linkage (V) or through the hinged parallelogram (G2) and the four-bar linkage (V), respectively, wherein the continuation of the edge (m) of the hinged parallelogram (G2), which lies opposite the edge (G2V), intersects the continuation of the edge (c) at the central point (10), likewise the continuation of the diagonal of the four-bar linkage (V) between the outermost corner point (AB) and the inner corner point (GG).

B9. The chair according to paragraph B8, characterized in that at least two movement grids are provided that have a common central point (10).

The specific embodiments as disclosed and illustrated herein are not to be considered in a limiting sense, because numerous variations are possible. The subject matter of the embodiment(s) includes all novel and nonobvious combinations and subcombinations of the various elements, features, functions, and/or properties disclosed herein. The following claims particularly point out certain combinations and subcombinations regarded as novel and nonobvious.

Invention(s) embodied in other combinations and subcombinations of features, functions, elements, and/or properties may be claimed in applications claiming priority from this or a related application. Such claims, whether directed to a different embodiment or to the same embodiment, and whether broader, narrower, equal, or different in scope to the original claims, also are regarded as included within the subject matter of the embodiment(s) of the present disclosure.

What is claimed is:

1. An item of furniture comprising:
   a chassis;
   a kinematic mechanism mounted upon the chassis; and
   a base furniture part movably coupled to the kinematic mechanism;
   wherein the chassis includes a substantially vertically arranged column having an upper end;
   the base furniture part includes a support part attached to the upper end of the column and a seat surface secured to the support part; and
   the kinematic mechanism includes a pivot mechanism having a base part that is disposed between the support part and the seat surface, with the seat surface being movably coupled to the base part, where the pivot mechanism includes at least one base arm arranged pivotably on the support part via a pivot part, and an intermediate part which is arranged pivotably on the base arm and which is mounted pivotably on the seat surface or on the base part;
   wherein the pivot axis of the base arm, the pivot axis of the intermediate part, and the pivot axis of the seat surface or base part intersect one another at a central point that is disposed above the seat surface, and the seat surface can execute a spherical movement relative to the support part, the spherical movement being about the central point.

2. The item of furniture of claim 1, wherein the pivot part is connected resiliently to a pivotable furniture part.

3. The item of furniture of claim 2, wherein the item of furniture is an office chair; and the pivotable furniture part is a backrest of the office chair.

4. The item of furniture of claim 3, wherein the base part of the pivot mechanism is connected to an underside of the seat surface rearward of a point where the seat surface is secured to the support part.

5. The item of furniture of claim 4, wherein the seat surface is pivotably secured to the support part.

6. The item of furniture of claim 1, wherein a pin is connected to the support part, a slotted-guide opening is connected to one of the seat surface and the support part, and the pin protrudes into the slotted-guide opening.

7. The item of furniture of claim 1, wherein the substantially vertically arranged column is at least one of movable and height-adjustable.

8. The item of furniture of claim 1, further comprising at least one of a backrest, a knee support, and a pair of armrests.

9. The item of furniture of claim 6, wherein either the slotted-guide opening or the pin is provided on the base part to which the kinematic is engaged.

10. The item of furniture of claim 9, wherein at least one of the slotted-guide opening or the pin is connected resiliently to the base part.

11. The item of furniture of claim 6, wherein at least one of the pin and the slotted-guide opening is connected resiliently to the support part.

12. The item of furniture of claim 6, wherein the pin carries a radially resilient rotatable ring that is in contact with an edge of the slotted-guide opening.

* * * * *

UNITED STATES PATENT AND TRADEMARK OFFICE
CERTIFICATE OF CORRECTION

PATENT NO. : 9,968,196 B2
APPLICATION NO. : 14/859089
DATED : May 15, 2018
INVENTOR(S) : Franz Ehrenleitner Page 1 of 1

It is certified that error appears in the above-identified patent and that said Letters Patent is hereby corrected as shown below:

On the Title Page

Please insert:
--(30) Foreign Application Priority Data
September 18, 2014 (DE)..............................102014013560.8
April 24, 2015 (AT)..............................A50328/2015--

Signed and Sealed this
Thirtieth Day of July, 2019

Andrei Iancu
*Director of the United States Patent and Trademark Office*